US012149363B2

(12) United States Patent
Zou et al.

(10) Patent No.: US 12,149,363 B2
(45) Date of Patent: Nov. 19, 2024

(54) HARQ PROCESS FOR CELLS CONFIGURED FOR MULTIPLE CONFIGURED UPLINK GRANTS

(71) Applicant: Telefonaktiebolaget LM Ericsson (publ), Stockholm (SE)

(72) Inventors: Zhenhua Zou, Solna (SE); Abdulrahman Alabbasi, Kista (SE); Torsten Dudda, Wassenberg (DE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 347 days.

(21) Appl. No.: 17/599,336

(22) PCT Filed: Mar. 23, 2020

(86) PCT No.: PCT/SE2020/050297
§ 371 (c)(1),
(2) Date: Sep. 28, 2021

(87) PCT Pub. No.: WO2020/197472
PCT Pub. Date: Oct. 1, 2020

(65) Prior Publication Data
US 2022/0200740 A1 Jun. 23, 2022

Related U.S. Application Data

(60) Provisional application No. 62/825,526, filed on Mar. 28, 2019.

(51) Int. Cl.
*H04L 1/1822* (2023.01)
*H04L 1/1812* (2023.01)
(Continued)

(52) U.S. Cl.
CPC .......... *H04L 1/1822* (2013.01); *H04L 1/1812* (2013.01); *H04L 1/188* (2013.01);
(Continued)

(58) Field of Classification Search
CPC ..... H04L 1/1822; H04L 1/1812; H04L 1/188; H04L 1/1887; H04W 72/1268; H04W 72/23
(Continued)

(56) References Cited

U.S. PATENT DOCUMENTS

2016/0135143 A1   5/2016 Won et al.
2017/0302493 A1*  10/2017 Yang ...................... H04W 72/21
(Continued)

FOREIGN PATENT DOCUMENTS

CN    104158640 A    11/2014
CN    105359603 A    2/2016
(Continued)

OTHER PUBLICATIONS

Author Unknown, "3rd Generation Partnership Project; Technical Specification Group Radio Access Network; Study on NR Industrial Internet of Things (IoT); (Release 16)," 3GPP TR 38.825 V1.0.0, Mar. 2019, 3GPP Organizational Partners, 32 pages.
(Continued)

*Primary Examiner* — Anh Ngoc M Nguyen
*Assistant Examiner* — Syed M Bokhari
(74) *Attorney, Agent, or Firm* — Withrow & Terranova, PLLC

(57) ABSTRACT

A hybrid automatic repeat request (HARQ) process for cells configurable for multiple uplink grants is provided. A new rule to define the HARQ process identifiers (IDs) for configured grant is introduced, in cases when multiple configured grant configurations are used. In some embodiments, a method performed by a wireless device for a HARQ process in a cell configurable for multiple configured uplink grants is provided. The method comprises receiving an uplink grant comprising a HARQ process ID; determining that a HARQ process associated with the HARQ process ID is configured
(Continued)

for a configured uplink grant based on a HARQ process ID offset; and starting or restarting a configured grant timer for the HARQ process. Selectively starting the configured grant timer depending on whether an identified HARQ process belongs to one of the multiple configured grant configurations, enables the gNB flexibility to schedule retransmissions or not.

19 Claims, 11 Drawing Sheets

(51) Int. Cl.
*H04L 1/1867* (2023.01)
*H04W 72/1268* (2023.01)
*H04W 72/23* (2023.01)

(52) U.S. Cl.
CPC ....... *H04L 1/1887* (2013.01); *H04W 72/1268* (2013.01); *H04W 72/23* (2023.01)

(58) Field of Classification Search
USPC ......................................................... 370/329
See application file for complete search history.

(56) References Cited

U.S. PATENT DOCUMENTS

| | | | | |
|---|---|---|---|---|
| 2018/0049229 | A1* | 2/2018 | Dinan | H04W 72/21 |
| 2018/0092122 | A1* | 3/2018 | Babaei | H04L 1/1822 |
| 2019/0253197 | A1* | 8/2019 | Babaei | H04L 1/188 |
| 2019/0356427 | A1* | 11/2019 | Babaei | H04L 1/1812 |
| 2020/0154469 | A1* | 5/2020 | Chin | H04L 1/1883 |

FOREIGN PATENT DOCUMENTS

| | | |
|---|---|---|
| CN | 106664714 A | 5/2017 |
| CN | 107683620 A | 2/2018 |
| EP | 2835023 B1 | 9/2021 |
| JP | 2019036777 A | 3/2019 |
| WO | 2020029787 A1 | 2/2020 |
| WO | 2020065615 A2 | 4/2020 |
| WO | 2020167612 A1 | 8/2020 |

OTHER PUBLICATIONS

Author Unknown, "3rd Generation Partnership Project; Technical Specification Group Radio Access Network;NR; Medium Access Control (MAC) protocol specification (Release 15)," 3GPP 38.321 V15.4.0, Dec. 2018, 3GPP Organizational Partners, 77 pages.
Catt, "R2-1900152: Multiple active SPS and Configured Grant Configurations," 3GPP TSG-RAN WG2 Meeting 105, Feb. 25-Mar. 1, 2019, 5 pages.
Huawei et al., "RP-190726: New WID: Physical Layer Enhancements for NR Ultra-Reliable and Low Latency Communication (URLLC)," 3GPP TSG RAN Meeting #83, Mar. 18-21, 2019, Shenzhen, China, 5 pages.
Nokia et al., "RP-182090: Revised SID: Study on NR Industrial Internet of Things (IoT)," 3GPP TSG RAN meeting #81, Sep. 10-13, 2018, Gold Coast, Australia, 5 pages.
Nokia et al., "RP-190728: New WID: Support of NR Industrial Internet of Things (IoT)," 3GPP TSG RAN Meeting #83, Mar. 18-21, 2019, Shenzhen, China, 6 pages.
Qualcomm Incorporated, "R1-1907263: Enhancements to Scheduling and HARQ operation for NR-U," 3GPP TSG RAN WG1 Meeting #97, May 13-17, 2019, Reno, US, 12 pages.
International Search Report and Written Opinion for International Patent Application No. PCT/SE2020/050297, mailed Jun. 2, 2020, 14 pages.
Catt, "Correction on PDSCH/PUSCH instance denomination", R2-1811216, 3GPP TSG-RAN WG2 Meeting #103, Gothenburg, Sweden, Aug. 20-24, 2018.
First Office Action for Chinese Patent Application No. 202080024611.3, mailed Jan. 25, 2024, 16 pages.
Decision to Grant for Chinese Patent Application No. 202080024611.3, mailed Sep. 23, 2024, 5 pages.

* cited by examiner

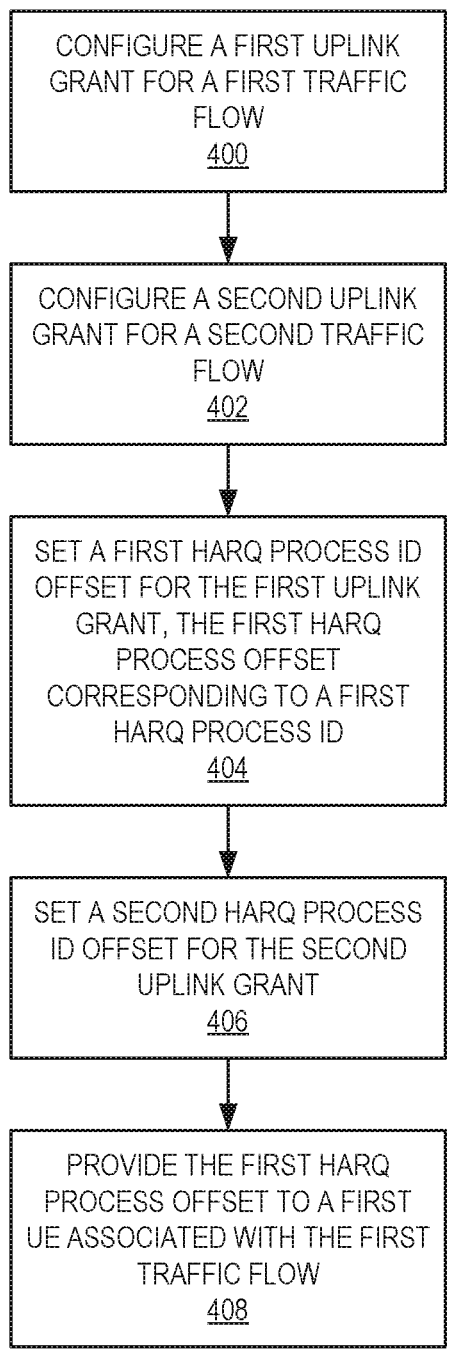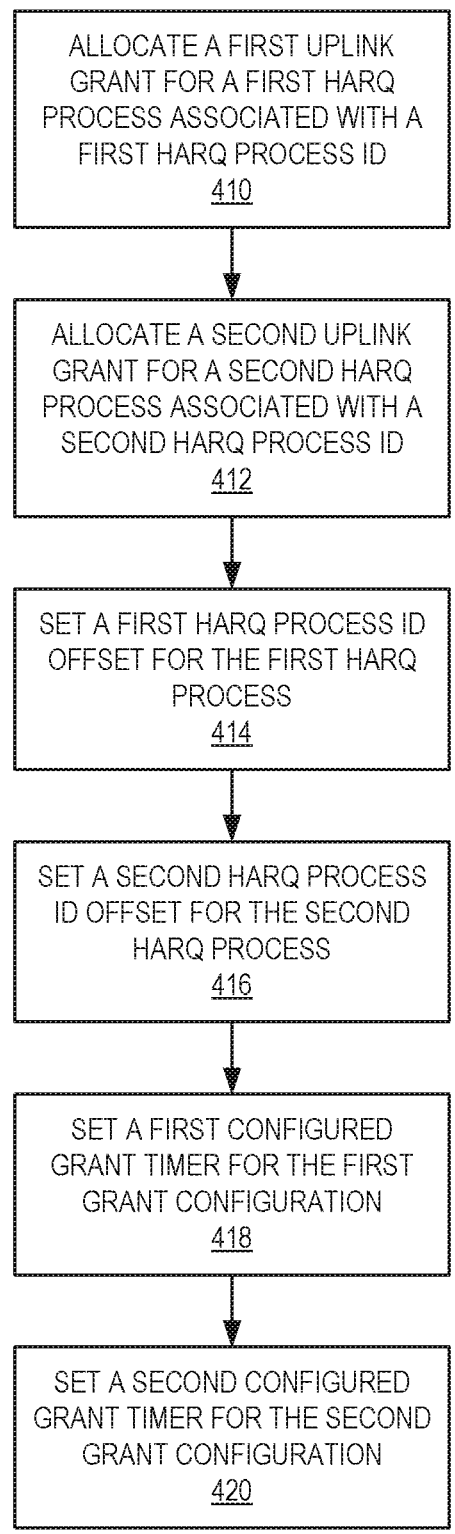
FIG. 4A
FIG. 4B

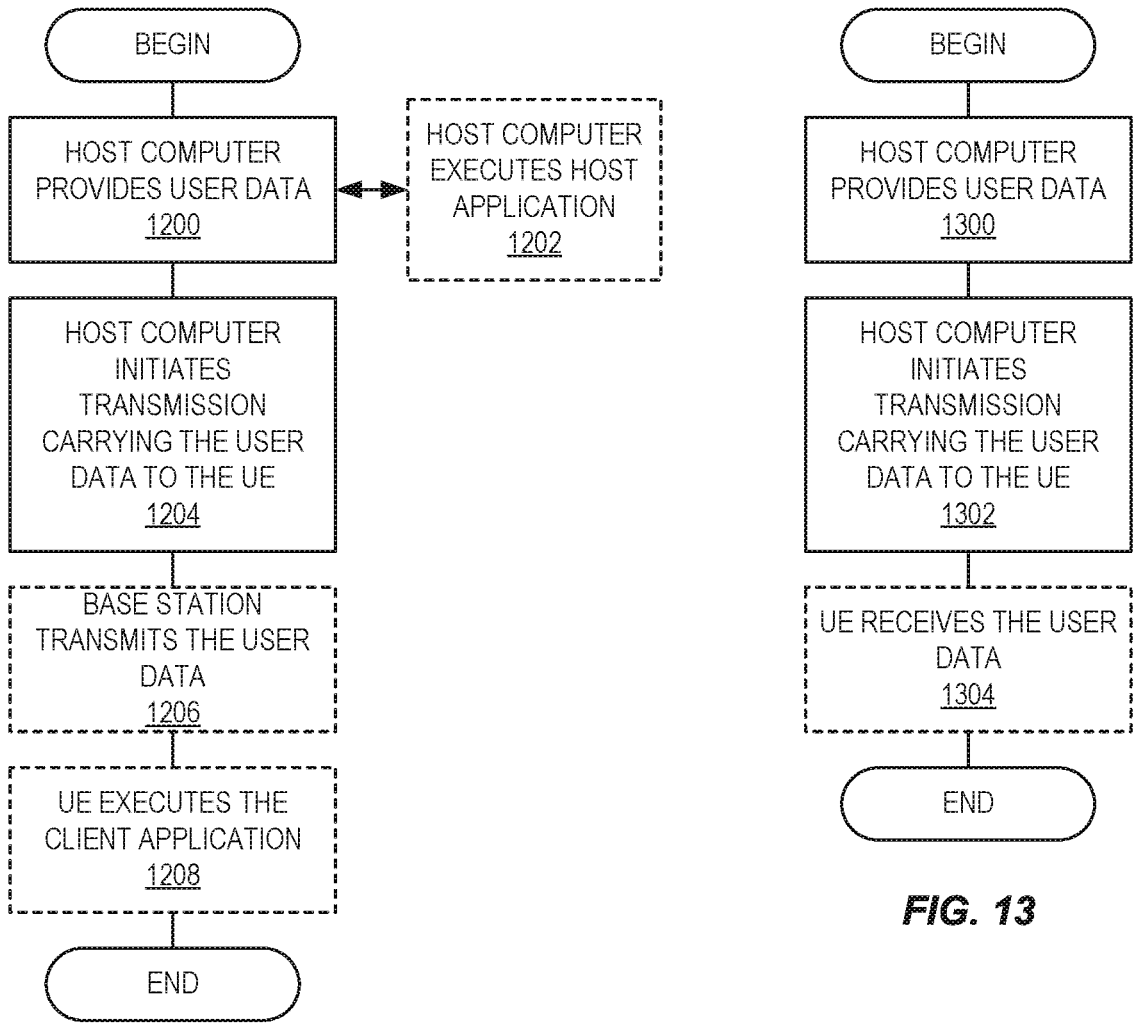

HARQ PROCESS FOR CELLS CONFIGURED FOR MULTIPLE CONFIGURED UPLINK GRANTS

RELATED APPLICATIONS

This application is a 35 U.S.C. § 371 national phase filing of International Application No. PCT/SE2020/050297, filed Mar. 23, 2020, which claims the benefit of provisional patent application Ser. No. 62/825,526, filed Mar. 28, 2019, the disclosures of which are hereby incorporated herein by reference in their entireties.

TECHNICAL FIELD

The present disclosure relates to configuration of Hybrid Automatic Repeat Request (HARQ) processes in telecommunications systems.

BACKGROUND

Support for Time Sensitive Networking (TSN) traffic flows in telecommunications systems has been studied. For example, the Third Generation Partnership Project (3GPP) commissioned study item RP-182090, Revised SID: Study on New Radio (NR) Industrial Internet of Things (IoT). Among other things, the study concluded with technical report 38.825. In particular, the report mentions that in TSN use cases (for example, in a future factory environment) the User Equipment (UEs) need to deploy multiple periodic streams with critical priority, each of which may have different periodicities. For example, multiple TSN streams may originate from different applications. Therefore, a solution to serve multiple TSN traffic flows in a single UE may be required.

Under 3GPP standards, such as NR, configured uplink grants are provided to support TSN traffic flows. Configured uplink grants (as opposed to dynamic uplink grants) are persistent uplink grants that support latency, reliability, or other requirements of TSN traffic flows. In order to serve multiple TSN flows simultaneously, it is beneficial to support multiple Configured Grant configurations as well as multiple Semi-Persistent Scheduling (SPS) configurations in the single UE, for a given Bandwidth Part (BWP) of a serving cell.

In 3GPP follow-up work items RP-190726 and RP-190728, the detailed objectives include:

Specification of enhanced Uplink (UL) configured grant transmission [RAN1, RAN2]
  a Multiple active configured grant type 1 and type 2 configurations for a given BWP of a serving cell
    Note: Vehicle-To-Everything (V2X) use cases are also considered A configured uplink grant can be supported by one of multiple Hybrid Automatic Repeat Request (HARQ) processes, each HARQ process being identified by a separate HARQ process Identifier (ID). The current NR Rel-15 specification calculates the HARQ process ID per configured uplink grant as follows (see clause 5.4.1 in 3GPP Technical Specification (TS) 38.321):

For configured uplink grants, the HARQ Process ID associated with the first symbol of a UL transmission is derived from the following equation:

HARQ Process ID=[floor(CURRENT_symbol/periodicity)]modulo nrofHARQ-Processes

However, the above HARQ process ID decision method cannot be directly applied to configured grants from multiple configured grant configurations, since it leads to a significant limitation on NR base station (gNB) configuration.

In NR rel-15, a configured grant timer is introduced. The ConfiguredGrantTimer is used to prevent a new configured grant transmission of the same HARQ process. The timer only applies to the HARQ process if it is configured for a configured uplink grant. This is to allow the network sufficient time to process the previous transmission and (in case of error decoding at gNB) send a re-transmission dynamic UL grant. The way it is specified in the MAC specification is that: only when the corresponding configuredGrantTimer is not running, the configured grant can be delivered to the HARQ entity for further processing (see clause 5.4.1 in 3GPP TS 38.321).

There currently exist certain challenge(s). With the introduction of support for multiple TSN traffic flows, the HARQ processes associated with a configured uplink grant are unclear. In addition, there is a need to have the proper operation of when a configured grant timer should start or not and hence a need to define what the HARQ process is for a configured uplink grant.

SUMMARY

A hybrid automatic repeat request (HARQ) process for cells configurable for multiple uplink grants is provided. A new rule to define the HARQ process Identifiers (IDs) for configured grant is introduced, in cases when multiple configured grant configurations are used. Based on this, a configured grant timer is selectively started/restarted.

There are, proposed herein, various embodiments which address one or more of the issues disclosed herein. In some embodiments, a method performed by a wireless device for a HARQ process in a cell configurable for multiple configured uplink grants is provided. The method comprises receiving an uplink grant comprising a HARQ process ID; determining that a HARQ process associated with the HARQ process ID is configured for a configured uplink grant based on a HARQ process ID offset; and starting or restarting a configured grant timer for the HARQ process.

In some embodiments, the HARQ process ID is associated with a grant configuration of the configured uplink grant.

In some embodiments, determining that the HARQ process is configured for the configured uplink grant is further based on the HARQ process ID and a number of HARQ processes per configured grant. In some embodiments, determining that the HARQ process is configured for the configured uplink grant comprises determining that the HARQ process ID is greater than or equal to the HARQ process ID offset and less than a sum of the HARQ process ID offset and a number of HARQ processes for configured grant.

In some embodiments, the HARQ process ID for the configured uplink grant is determined according to:

HARQ Process ID=[floor(CURRENT_symbol/periodicity)]modulo nrofHARQ-Processes+harq-procID-offset, where CURRENT_symbol is a symbol index of a data transmission for the uplink grant, periodicity is a periodicity of the uplink grant, nrofHARQ-Processes is a number of HARQ processes for configured grants, and harq-procID-offset is the HARQ process ID offset. In some embodiments, the harq-procID-offset and the nrofHARQ-Processes for the uplink grant is received by one or more Radio Resource Control (RRC) messages, one or more Downlink Control Information (DCI) messages, or a combination of one or more RRC messages and one or more DCI messages.

In some embodiments, the method further comprises transmitting uplink data in accordance with the uplink grant. In some embodiments, the uplink data comprises the HARQ process ID offset.

In some embodiments, the uplink grant is received over an RRC message.

In some embodiments, the uplink grant is received over a DCI message.

In some embodiments, the method further comprises receiving another uplink grant associated with another HARQ process ID different from the HARQ process ID; and determining whether another HARQ process associated with the HARQ process ID is configured for another configured uplink grant based on another HARQ process ID offset. In some embodiments, the method further comprises starting or restarting another configured grant timer for the another HARQ process if the another HARQ process is configured for the another configured uplink grant.

In some embodiments, a method performed by a wireless device for transmitting uplink data using a HARQ process is provided. The method includes receiving a first uplink grant associated with a first HARQ process ID; determining that a first HARQ process is configured for a first configured uplink grant based on a first HARQ process ID offset; and setting a first configured grant timer for the first uplink grant in accordance with the first HARQ process.

In some embodiments, the first HARQ process is identified by the first HARQ process ID; and the first HARQ process ID is determined according to:

HARQ Process ID=[floor(CURRENT_symbol/periodicity)]modulo nrofHARQ-Processes+harq-procID-offset, where CURRENT_symbol is a symbol index of a data transmission for the uplink grant, periodicity is a periodicity of the uplink grant, nrofHARQ-Processes is a number of HARQ processes for configured grants, and harq-procID-offset is the first HARQ process ID offset.

In some embodiments, the method further comprises receiving a second uplink grant associated with a second HARQ process ID; determining that a second HARQ process associated with the second HARQ process ID is configured for a second configured uplink grant based on a second HARQ process ID offset; and setting a second configured grant timer for the second uplink grant in accordance with the second HARQ process. In some embodiments, the second configured grant timer is set with same parameters as the first configured grant timer. In some embodiments, the second configured grant timer is set with at least one different parameter as the first configured grant timer.

In some embodiments, the method further comprises transmitting first uplink data using the first uplink grant and starting or restarting the first configured grant timer.

In some embodiments, a method performed by a base station for allocating uplink grants for multiple grant configurations is provided. The method includes configuring a first uplink grant for a first traffic flow; configuring a second uplink grant for a second traffic flow; setting a first HARQ process ID offset for the first uplink grant, the first HARQ process ID offset corresponding to a first HARQ process ID; setting a second HARQ process ID offset for the second uplink grant; and providing the first HARQ process ID offset to a first User Equipment (UE) associated with the first traffic flow.

In some embodiments, the method further comprises providing the second HARQ process ID offset to the first UE. In some embodiments, the method further comprises providing the second HARQ process ID offset to a second UE associated with the second traffic flow.

In some embodiments, the method further comprises determining a number of HARQ processes configured for configured grant; providing the number of HARQ processes configured for configured grant to the first UE.

In some embodiments, the method further comprises deactivating the second uplink grant; resetting the first HARQ process ID offset in response to deactivating the second uplink grant. In some embodiments, the method further comprises updating the number of HARQ processes configured for configured grant in response to deactivating the second uplink grant.

In some embodiments, the first HARQ process ID offset is provided through an RRC message.

In some embodiments, the first HARQ process ID offset is provided through a DCI message.

In some embodiments, a wireless device for configuring a HARQ process in a cell configurable for multiple uplink grants is provided, the wireless device adapted to perform the method of any of the above embodiments.

In some embodiments, the wireless device comprises processing circuitry adapted to perform the method of any of the above embodiments.

In some embodiments, a base station for allocating uplink grants for multiple grant configurations is provided, the base station adapted to perform the method of any of the above embodiments.

Certain embodiments may provide one or more of the following technical advantage(s). Selectively starting the configured grant timer depending on whether an identified HARQ process belongs to one of the multiple configured grant configurations, enables the gNB flexibility to schedule retransmissions (when configured grant timer is started) or not (in which case new data can be sent directly on configured grants).

BRIEF DESCRIPTION OF THE DRAWINGS

The accompanying drawing figures incorporated in and forming a part of this specification illustrate several aspects of the disclosure, and together with the description serve to explain the principles of the disclosure.

FIG. 4A is a flowchart illustrating a method implemented in a base station in accordance with particular embodiments.

FIG. 4B is a flowchart illustrating an alternative embodiment of the method of FIG. 4A.

FIG. 12 is a flowchart illustrating a method implemented in a communication system, in accordance with one embodiment.

FIG. 13 is a flowchart illustrating a method implemented in a communication system, in accordance with one embodiment.

DETAILED DESCRIPTION

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure.

Radio Node: As used herein, a "radio node" is either a radio access node or a wireless device.

Radio Access Node: As used herein, a "radio access node" or "radio network node" is any node in a radio access network of a cellular communications network that operates to wirelessly transmit and/or receive signals. Some examples of a radio access node include, but are not limited to, a base station (e.g., a New Radio (NR) base station (gNB) in a Third Generation Partnership Project (3GPP) Fifth Generation (5G) NR network or an enhanced or evolved Node B (eNB) in a 3GPP Long Term Evolution (LTE) network), a high-power or macro base station, a low-power base station (e.g., a micro base station, a pico base station, a home eNB, or the like), and a relay node.

Core Network Node: As used herein, a "core network node" is any type of node in a core network. Some examples of a core network node include, e.g., a Mobility Management Entity (MME), a Packet Data Network Gateway (P-GW), a Service Capability Exposure Function (SCEF), or the like.

Wireless Device: As used herein, a "wireless device" is any type of device that has access to (i.e., is served by) a cellular communications network by wirelessly transmitting and/or receiving signals to a radio access node(s). Some examples of a wireless device include, but are not limited to, a User Equipment device (UE) in a 3GPP network and a Machine Type Communication (MTC) device.

Network Node: As used herein, a "network node" is any node that is either part of the radio access network or the core network of a cellular communications network/system.

Note that the description given herein focuses on a 3GPP cellular communications system and, as such, 3GPP terminology or terminology similar to 3GPP terminology is oftentimes used. However, the concepts disclosed herein are not limited to a 3GPP system.

Note that, in the description herein, reference may be made to the term "cell"; however, particularly with respect to 5G NR concepts, beams may be used instead of cells and, as such, it is important to note that the concepts described herein are equally applicable to both cells and beams.

Figure 1:
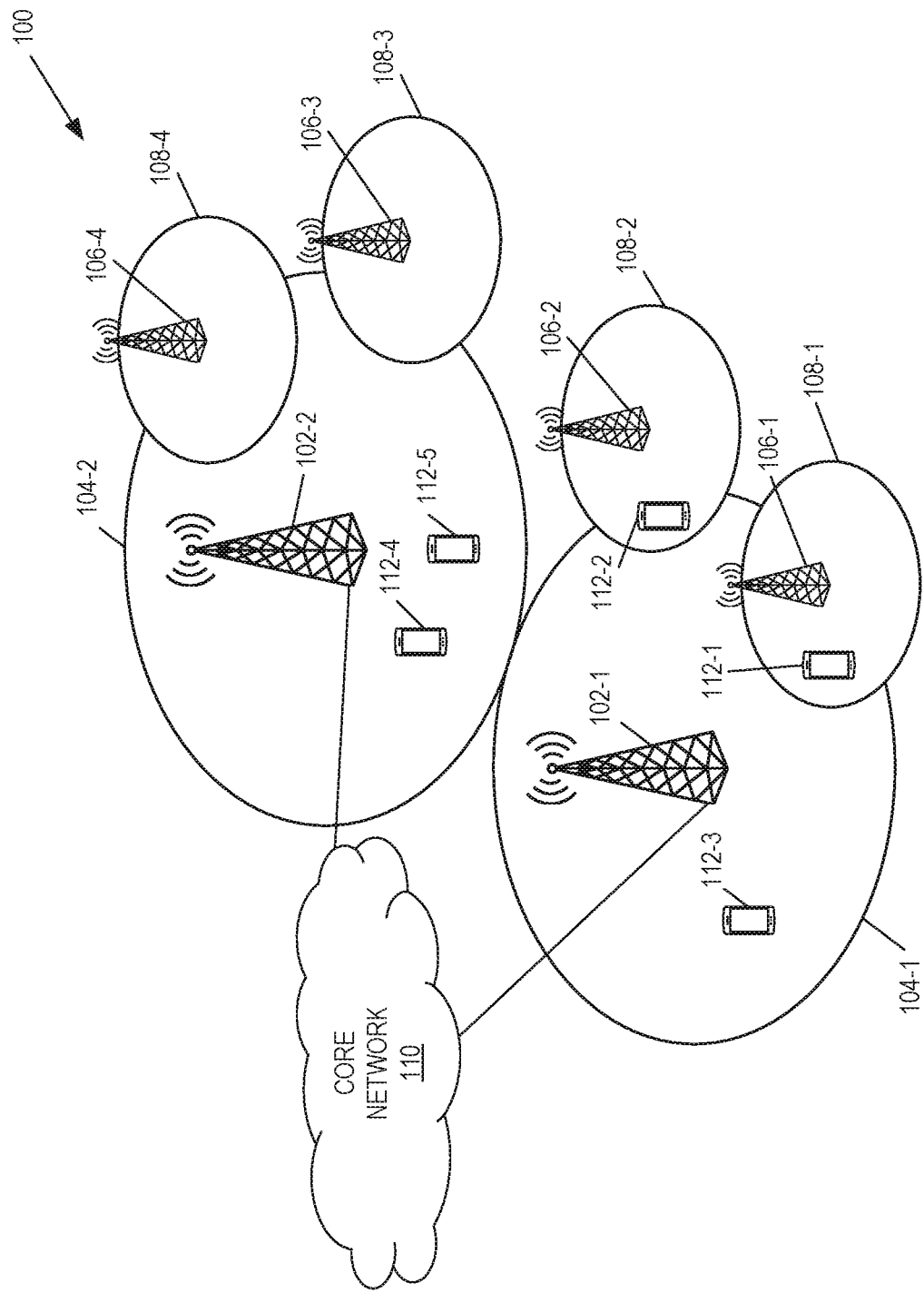
FIG. 1 illustrates one example of a cellular communications network 100 according to some embodiments of the present disclosure.

FIG. 1 illustrates one example of a cellular communications network 100 according to some embodiments of the present disclosure. In the embodiments described herein, the cellular communications network 100 is a 5G NR network. In this example, the cellular communications network 100 includes base stations 102-1 and 102-2, which in LTE are referred to as eNBs and in 5G NR are referred to as gNBs, controlling corresponding macro cells 104-1 and 104-2. The base stations 102-1 and 102-2 are generally referred to herein collectively as base stations 102 and individually as base station 102. Likewise, the macro cells 104-1 and 104-2 are generally referred to herein collectively as macro cells 104 and individually as macro cell 104. The cellular communications network 100 may also include a number of low power nodes 106-1 through 106-4 controlling corresponding small cells 108-1 through 108-4. The low power nodes 106-1 through 106-4 can be small base stations (such as pico or femto base stations) or Remote Radio Heads (RRHs), or the like. Notably, while not illustrated, one or more of the small cells 108-1 through 108-4 may alternatively be provided by the base stations 102. The low power nodes 106-1 through 106-4 are generally referred to herein collectively as low power nodes 106 and individually as low power node 106. Likewise, the small cells 108-1 through 108-4 are generally referred to herein collectively as small cells 108 and individually as small cell 108. The base stations 102 (and optionally the low power nodes 106) are connected to a core network 110.

The base stations 102 and the low power nodes 106 provide service to wireless devices 112-1 through 112-5 in the corresponding cells 104 and 108. The wireless devices 112-1 through 112-5 are generally referred to herein collectively as wireless devices 112 and individually as wireless device 112. The wireless devices 112 are also sometimes referred to herein as UEs.

In an exemplary aspect, the cellular communications network 100 facilitates service of multiple Time Sensitive Networking (TSN) traffic flows simultaneously. Thus, it is beneficial for the cellular communications network 100 to support multiple configured grant configurations as well as multiple Semi-Persistent Scheduling (SPS) configurations in a single UE (e.g., a wireless device 112), for a given Bandwidth Part (BWP) of a serving cell (e.g., a macro cell 104 or a small cell 108).

A configured uplink grant to a UE (e.g., the wireless device 112) can be supported by one of multiple Hybrid Automatic Repeat Request (HARQ) processes, each HARQ process being identified by a separate HARQ process Identifier (ID). As described above, with the introduction of support for multiple TSN traffic flows, the HARQ processes associated with a configured uplink grant are unclear.

In this regard, the current HARQ process ID decision method cannot be directly applied to configured grants from multiple configured grant configurations, since it leads to a significant limitation on configuration of the base station 112 (e.g., an NR gNB). However, it is beneficial to separate between the grant configurations' perspective HARQ Process Identifier (PID) pools. One solution is to configure an offset associated with each configuration. The solution is logical because it separates the HARQ process pools between different grant configurations, hence grant configurations will have independent operations.

Such configurable offset should be reflected in the Medium Access Control (MAC) HARQ PID decision equation, and on the Radio Resource Control (RRC) ConfiguredGrantConfig element. It can be described as:

HARQ Process ID=[floor(CURRENT_symbol/periodicity)]modulo nrofHARQ-Processes+harpprocID-offset In addition, there is a need to have the proper operation of when a configured grant timer should start or not and hence a need to define what the HARQ process is for a configured uplink grant. For example, it appears numerous times in the MAC 3GPP specification (clause 5.4.2.1) that 4> if the uplink grant is addressed to C-RNTI, and the identified HARQ process is configured for a configured uplink grant:
5> start or restart the configuredGrantTimer, if configured, for the corresponding HARQ process when the transmission is performed.

In order to solve that, there is a note in the MAC specification to state the definition of the HARQ processes for configured grant:

NOTE 2: A HARQ process is configured for a configured uplink grant if the configured uplink grant is activated and the associated HARQ process ID is less than nrofHARQ-Processes.

According to the above specification, when the gNB issues a dynamic uplink grant to the UE, and the HARQ process identified according to this grant is less than the nrofHARQprocesses configured for the configured grant, the configured grant timer is (re)started; otherwise not.

According to the following embodiments, a configured grant timer is started or restarted depending on whether an identified HARQ process belongs to a certain group of HARQ processes (e.g., a group of HARQ processes configured and/or valid for a certain (or multiple) of multiple configured grant configurations). The configured grant timer is started/restarted when a HARQ process is configured for a configured uplink grant. The following embodiments give details of this definition:

In a first exemplary aspect, a HARQ process is configured for a configured uplink grant if the configured uplink grant is activated and the associated HARQ process ID belongs to the following set:

HARQ-proc-Offset_i,HARQ-proc-Offset_i+1, . . . ,HARQ-proc-Offset_i+nrofHARQ-Processes_i−1 in which HARQ-proc-Offset_i represents a HARQ process offset for grant configuration i and nrofHARQ-Processes_i represents a number of HARQ processes for the configured grant configuration i in RRC.

Furthermore, a HARQ process is considered configured for configured grant operation if the HARQ process belongs to or is configured for it; e.g., the HARQ process is valid according to the first exemplary aspect above for any of the multiple configured grant configurations.

In a second exemplary aspect, a HARQ process is configured for a configured uplink grant if the configured uplink grant is activated and the associated HARQ process ID is smaller than:

nrofHARQ-Processes_i*+HARQ-Proc-Offset_i* in which i* is the configuration index that has the largest value of HARQ-Proc-Offset.

In some embodiments, the gNB allocates contiguous HARQ process IDs from zero for different configurations.

In case some flows are stopped (and the associated Configuration Group (CG) is deactivated) while additional flows arrive at the UE. In such cases, the gNB needs to configure a new nrofHARQ-Processes_i and HARQ-Proc-Offset_i: It might be needed that the gNB quickly allocate such parameters using Downlink Control Information (DCI) messages instead of RRC. Therefore, in some embodiments, the gNB might allocate such parameters using DCI messages.

In some cases, the gNB might allocate multiple CG configurations to overcome misalignment of data arrival. Hence, the gNB allocates the same nrofHARQ-Processes_i and HARQ-Proc-Offset_i per multiple configuration since they will accommodate the same traffic. In this case, the configured grant timer shall be started/restarted according to the same conditions above. These embodiments are further described below with reference to FIGS. 2A-4B.

Figure 2A:
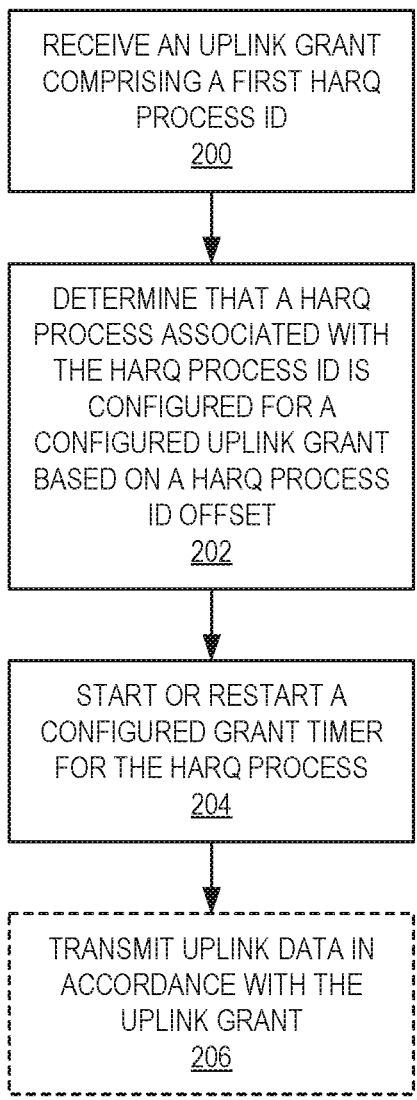
FIG. 2A is a flowchart illustrating a method implemented in a User Equipment (UE) in accordance with particular embodiments.

FIG. 2A is a flowchart illustrating a method in accordance with particular embodiments. This method may be performed by a UE. The method begins at step 200 with receiving an uplink grant comprising a HARQ process ID. The method also includes step 202 with determining that a HARQ process associated with the HARQ process ID is configured for a configured uplink grant based on a HARQ process ID offset. In some examples, the HARQ process ID for the configured uplink grant is determined according to:

HARQ Process ID=[floor(CURRENT_symbol/periodicity)]modulo nrofHARQ-Processes+harpprocID-offset where CURRENT_symbol is a symbol index of a data transmission for the uplink grant, periodicity is a periodicity of the uplink grant, nrofHARQ-Processes is a number of HARQ processes for configured grants, and harq-procID-offset, is the HARQ process ID offset. The method also includes step 204, with starting or restarting a configured grant timer for the HARQ process. The method may optionally include transmitting uplink data in accordance with the uplink grant (e.g., by including the HARQ process ID offset).

Figure 2B:
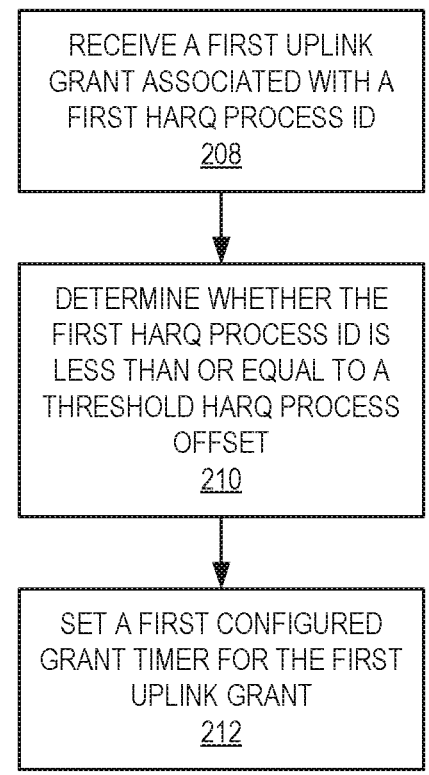
FIG. 2B is a flowchart illustrating an alternative embodiment of the method of FIG. 2A.

FIG. 2B is a flowchart illustrating an alternative embodiment of the method of FIG. 2A, which may also be performed by a UE. The method begins at step 208 with receiving a first uplink grant associated with a first HARQ process ID. The method also includes step 210 with determining whether the first HARQ process ID is less than or equal to a threshold HARQ process offset. The method also includes step 212, with, if the first HARQ process ID is less than or equal to a threshold HARQ process offset, setting a first configured grant timer for the first uplink grant.

Figure 3A:
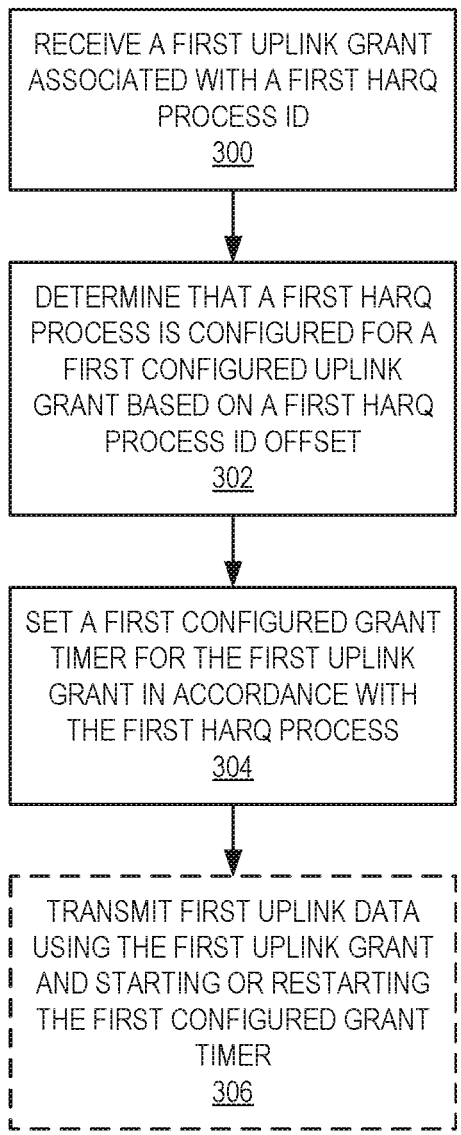
FIG. 3A is a flowchart illustrating a method implemented in a UE in accordance with particular embodiments.

FIG. 3A is a flowchart illustrating a method in accordance with particular embodiments. This method may be performed by a UE. The method begins at step 300 with receiving a first uplink grant associated with a first HARQ process ID. The method also includes step 302 with determining that a first HARQ process is configured for a first configured uplink grant based on a first HARQ process ID offset. The method also includes step 304 with setting a first configured grant timer for the first uplink grant in accordance with the first HARQ process. The method may optionally include step 306 with transmitting first uplink data using the first uplink grant and starting or restarting the first configured grant timer.

Figure 3B:
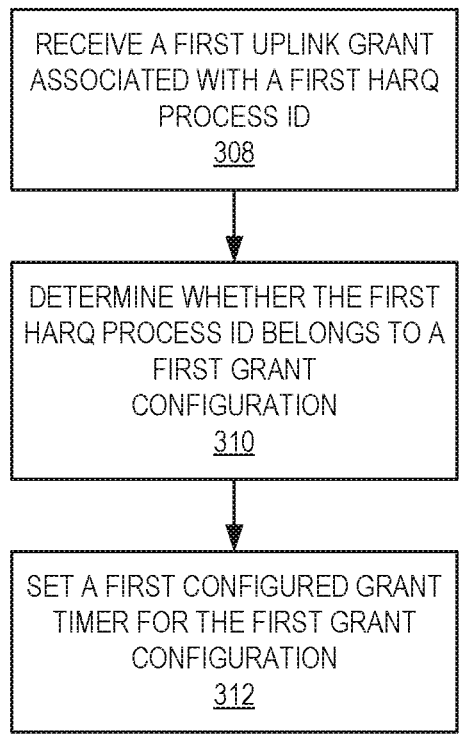
FIG. 3B is a flowchart illustrating an alternative embodiment of the method of FIG. 3A.

FIG. 3B is a flowchart illustrating an alternative embodiment of the method of FIG. 3A, which may also be performed by a UE. The method begins at step 308 with receiving a first uplink grant associated with a first HARQ process ID. The method also includes step 310 with determining whether the first HARQ process ID belongs to a first grant configuration. The method also includes step 312, with, if the first HARQ process ID belongs to the first grant configuration, setting a first configured grant timer for the first grant configuration.

FIG. 4A is a flowchart illustrating a method in accordance with particular embodiments. This method may be performed by a base station. The method begins at step 400 with configuring a first uplink grant for a first traffic flow (e.g., one of multiple TSN traffic flows). The method also includes step 402 with configuring a second uplink grant for a second traffic flow. The method also includes step 404 with setting a first HARQ process ID offset for the first uplink grant, the first HARQ process offset corresponding to a first HARQ process ID. The method also includes step 406 with setting a second HARQ process ID offset for the second uplink grant. The second HARQ process ID offset may be distinct from the first HARQ process ID offset (e.g., due to different periodicity or other parameters, as described further above with respect to FIG. 1). The method also includes step 408 with providing the first HARQ process offset to a first UE associated with the first traffic flow.

FIG. 4B is a flowchart illustrating an alternative embodiment of the method of FIG. 4A, which may also be performed by a base station. The method begins at step 410 with allocating a first uplink grant for a first HARQ process associated with a first HARQ process ID. The method also includes step 412 with allocating a second uplink grant for a second HARQ process associated with a second HARQ process ID. The method also includes step 414 with setting a first HARQ process ID offset for the first HARQ process. The method also includes step 416 with setting a second HARQ process ID offset for the second HARQ process. The second HARQ process ID offset may be distinct from the first HARQ process ID offset (e.g., due to different periodicity or other parameters, as described further above with respect to FIG. 1). The method also includes step 418 with setting a first configured grant timer for the first grant configuration. The method also includes step 420 with setting a second configured grant timer for the second grant configuration.

Figure 5:
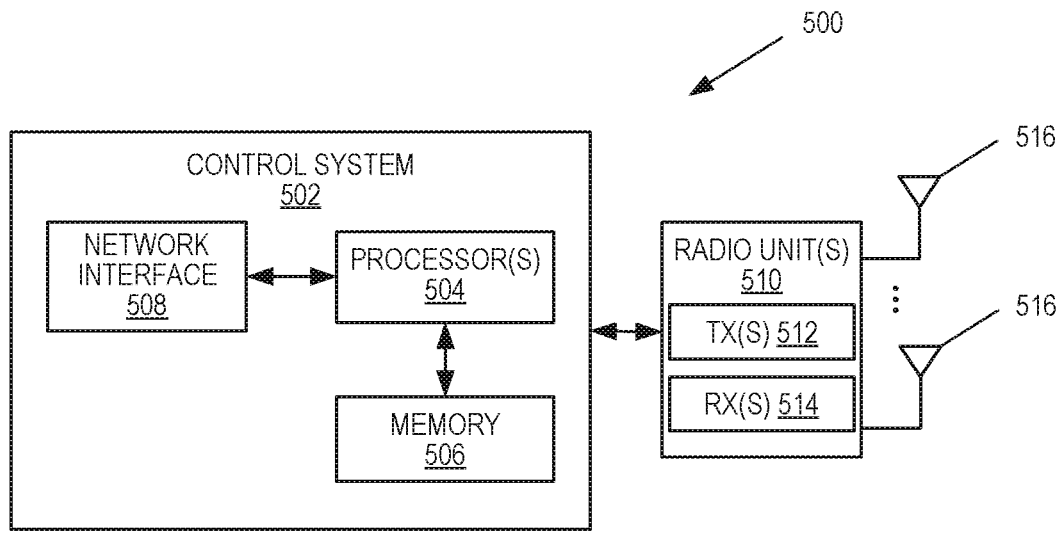
FIG. 5 is a schematic block diagram of a radio access node 500 according to some embodiments of the present disclosure.

FIG. 5 is a schematic block diagram of a radio access node 500 according to some embodiments of the present disclosure. The radio access node 500 may be, for example, a base station 102 or 106. As illustrated, the radio access node 500 includes a control system 502 that includes one or more processors 504 (e.g., Central Processing Units (CPUs), Application Specific Integrated Circuits (ASICs), Field Programmable Gate Arrays (FPGAs), and/or the like), memory 506, and a network interface 508. The one or more processors 504 are also referred to herein as processing circuitry. In addition, the radio access node 500 includes one or more radio units 510 that each includes one or more transmitters 512 and one or more receivers 514 coupled to one or more antennas 516. The radio units 510 may be referred to or be part of radio interface circuitry. In some embodiments, the radio unit(s) 510 is external to the control system 502 and connected to the control system 502 via, e.g., a wired connection (e.g., an optical cable). However, in some other embodiments, the radio unit(s) 510 and potentially the antenna(s) 516 are integrated together with the control system 502. The one or more processors 504 operate to provide one or more functions of a radio access node 500 as described herein. In some embodiments, the function(s) are implemented in software that is stored, e.g., in the memory 506 and executed by the one or more processors 504.

Figure 6:
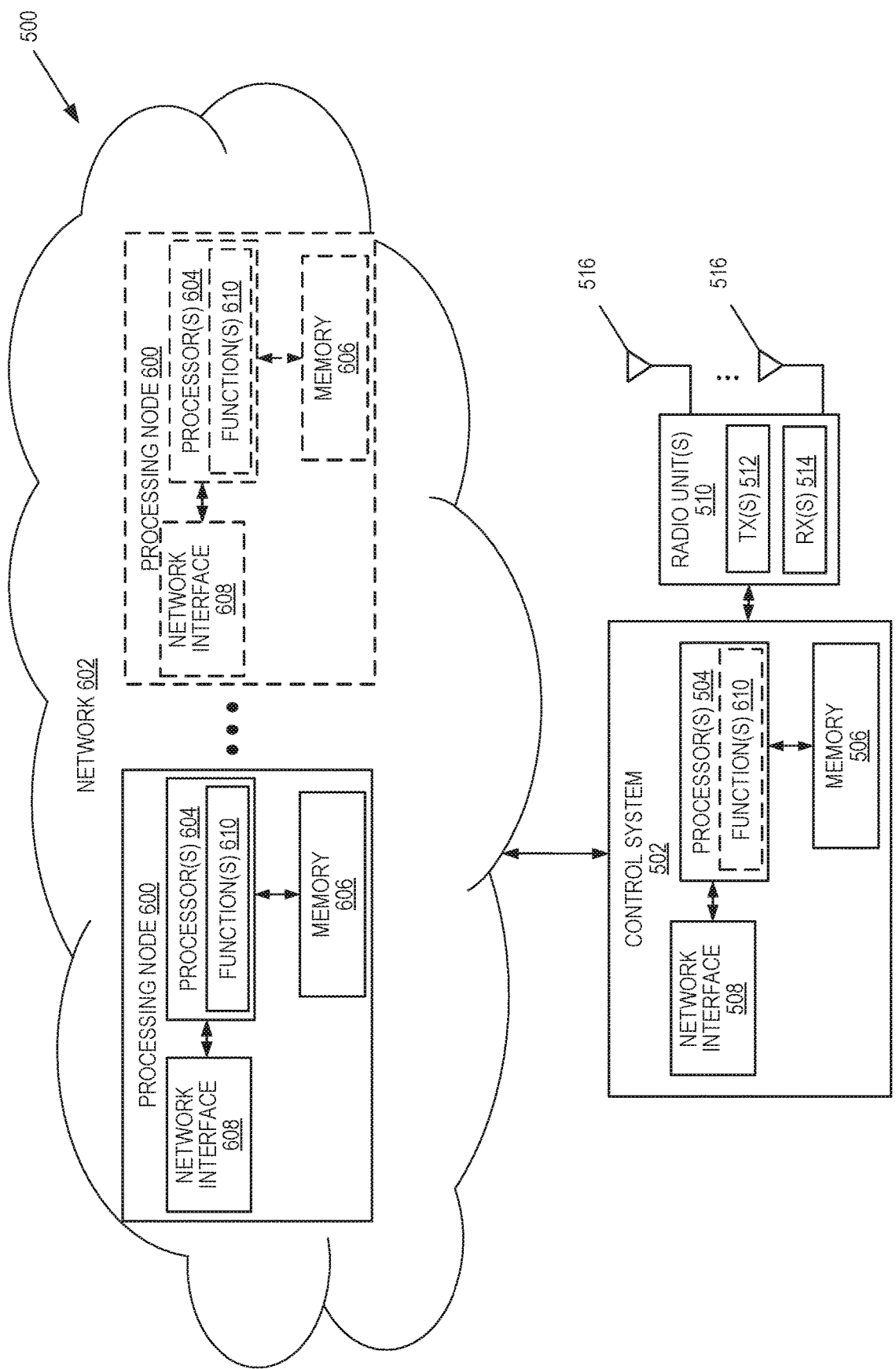
FIG. 6 is a schematic block diagram that illustrates a virtualized embodiment of the radio access node according to some embodiments of the present disclosure.

FIG. 6 is a schematic block diagram that illustrates a virtualized embodiment of the radio access node 500 according to some embodiments of the present disclosure. This discussion is equally applicable to other types of network nodes. Further, other types of network nodes may have similar virtualized architectures.

As used herein, a "virtualized" radio access node is an implementation of the radio access node 500 in which at least a portion of the functionality of the radio access node 500 is implemented as a virtual component(s) (e.g., via a virtual machine(s) executing on a physical processing node(s) in a network(s)). As illustrated, in this example, the radio access node 500 includes the control system 502 that includes the one or more processors 504 (e.g., CPUs, ASICs, FPGAs, and/or the like), the memory 506, and the network interface 508 and the one or more radio units 510 that each includes the one or more transmitters 512 and the one or more receivers 514 coupled to the one or more antennas 516, as described above. The control system 502 is connected to the radio unit(s) 510 via, for example, an optical cable or the like. The control system 502 is connected to one or more processing nodes 600 coupled to or included as part of a network(s) 602 via the network interface 508. Each processing node 600 includes one or more processors 604 (e.g., CPUs, ASICs, FPGAs, and/or the like), memory 606, and a network interface 608.

In this example, functions 610 of the radio access node 500 described herein are implemented at the one or more processing nodes 600 or distributed across the control system 502 and the one or more processing nodes 600 in any desired manner. In some particular embodiments, some or all of the functions 610 of the radio access node 500 described herein are implemented as virtual components executed by one or more virtual machines implemented in a virtual environment(s) hosted by the processing node(s) 600. As will be appreciated by one of ordinary skill in the art, additional signaling or communication between the processing node(s) 600 and the control system 502 is used in order to carry out at least some of the desired functions 610. Notably, in some embodiments, the control system 502 may not be included, in which case the radio unit(s) 510 communicate directly with the processing node(s) 600 via an appropriate network interface(s).

In some embodiments, a computer program including instructions which, when executed by at least one processor, causes the at least one processor to carry out the functionality of radio access node 500 or a node (e.g., a processing node 600) implementing one or more of the functions 610 of the radio access node 500 in a virtual environment according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 7:
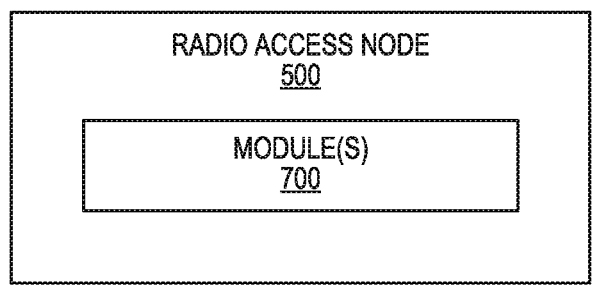
FIG. 7 is a schematic block diagram of the radio access node according to some other embodiments of the present disclosure.

FIG. 7 is a schematic block diagram of the radio access node 500 according to some other embodiments of the present disclosure. The radio access node 500 includes one or more modules 700, each of which is implemented in software. The module(s) 700 provide the functionality of the radio access node 500 described herein. This discussion is equally applicable to the processing node 600 of FIG. 6 where the modules 700 may be implemented at one of the processing nodes 600 or distributed across multiple processing nodes 600 and/or distributed across the processing node(s) 600 and the control system 502.

Figure 8:
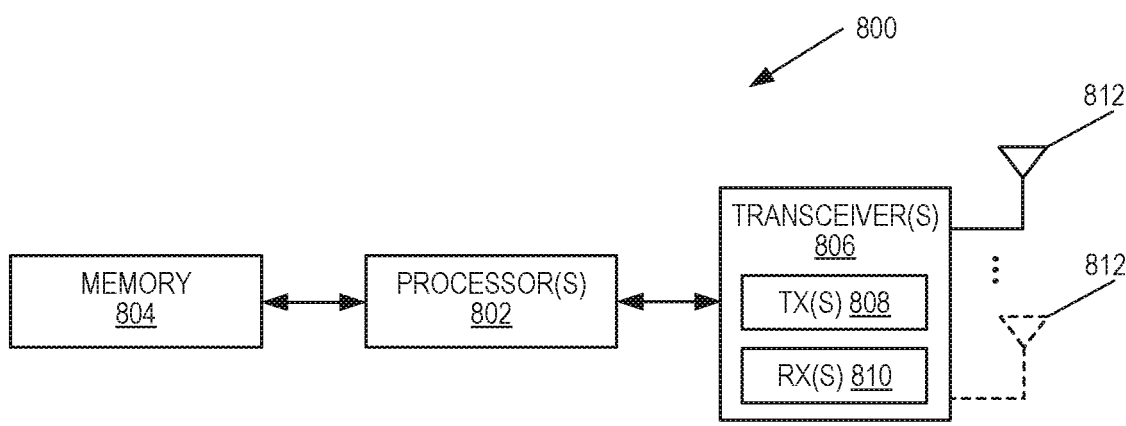
FIG. 8 is a schematic block diagram of a UE according to some embodiments of the present disclosure.

FIG. 8 is a schematic block diagram of a UE 800 according to some embodiments of the present disclosure. As illustrated, the UE 800 includes one or more processors 802 (e.g., CPUs, ASICs, FPGAs, and/or the like), memory 804, and one or more transceivers 806 each including one or more transmitters 808 and one or more receivers 810 coupled to one or more antennas 812. The transceiver(s) 806 includes radio-front end circuitry connected to the antenna(s) 812 that is configured to condition signals communicated between the antenna(s) 812 and the processor(s) 802, as will be appreciated by on of ordinary skill in the art. The processors 802 are also referred to herein as processing circuitry. The transceivers 806 are also referred to herein as radio circuitry. In some embodiments, the functionality of the UE 800 described above may be fully or partially implemented in software that is, e.g., stored in the memory 804 and executed by the processor(s) 802. Note that the UE 800 may include additional components not illustrated in FIG. 8 such as, e.g., one or more user interface components (e.g., an input/output interface including a display, buttons, a touch screen, a microphone, a speaker(s), and/or the like and/or any other components for allowing input of information into the UE 800 and/or allowing output of information from the UE 800), a power supply (e.g., a battery and associated power circuitry), etc.

In some embodiments, a computer program including instructions which, when executed by at least one processor, causes the at least one processor to carry out the functionality of the UE 800 according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 9:
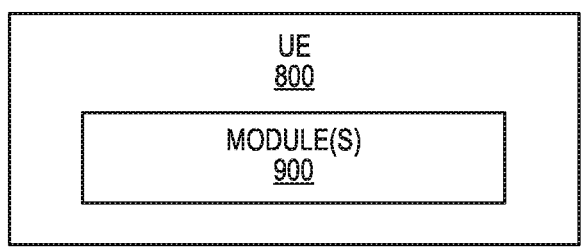
FIG. 9 is a schematic block diagram of the UE according to some other embodiments of the present disclosure.

FIG. 9 is a schematic block diagram of the UE 800 according to some other embodiments of the present disclosure. The UE 800 includes one or more modules 900, each of which is implemented in software. The module(s) 900 provide the functionality of the UE 800 described herein.

Figure 10:
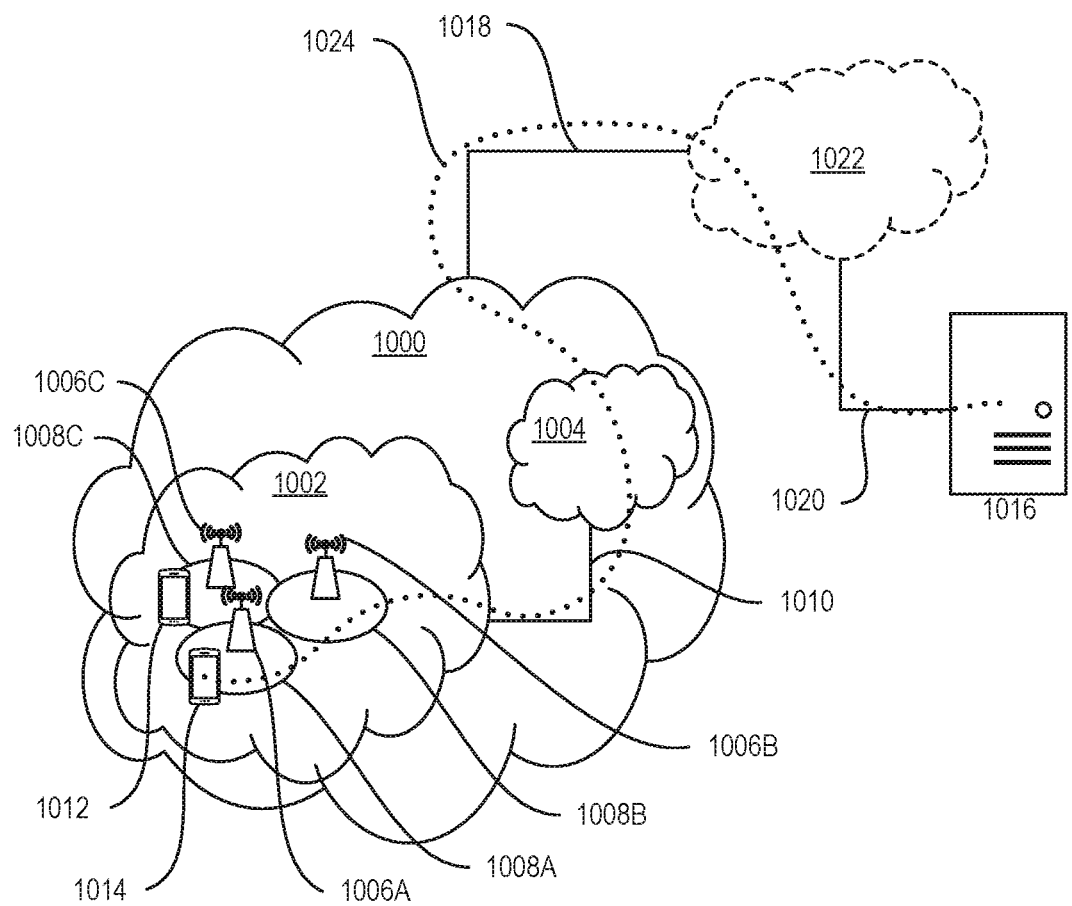
FIG. 10 illustrates an example communication system in which embodiments of the present disclosure may be implemented.

With reference to FIG. 10, in accordance with an embodiment, a communication system includes a telecommunication network 1000, such as a 3GPP-type cellular network, which comprises an access network 1002, such as a RAN, and a core network 1004. The access network 1002 comprises a plurality of base stations 1006A, 1006B, 1006C, such as NBs, eNBs, gNBs, or other types of wireless Access Points (APs), each defining a corresponding coverage area 1008A, 1008B, 1008C. Each base station 1006A, 1006B, 1006C is connectable to the core network 1004 over a wired or wireless connection 1010. A first UE 1012 located in coverage area 1008C is configured to wirelessly connect to, or be paged by, the corresponding base station 1006C. A second UE 1014 in coverage area 1008A is wirelessly connectable to the corresponding base station 1006A. While a plurality of UEs 1012, 1014 are illustrated in this example, the disclosed embodiments are equally applicable to a situation where a sole UE is in the coverage area or where a sole UE is connecting to the corresponding base station 1006.

The telecommunication network 1000 is itself connected to a host computer 1016, which may be embodied in the hardware and/or software of a standalone server, a cloud-implemented server, a distributed server, or as processing resources in a server farm. The host computer 1016 may be under the ownership or control of a service provider, or may be operated by the service provider or on behalf of the service provider. Connections 1018 and 1020 between the telecommunication network 1000 and the host computer 1016 may extend directly from the core network 1004 to the host computer 1016 or may go via an optional intermediate network 1022. The intermediate network 1022 may be one of, or a combination of more than one of, a public, private, or hosted network; the intermediate network 1022, if any, may be a backbone network or the Internet; in particular, the intermediate network 1022 may comprise two or more sub-networks (not shown).

The communication system of FIG. 10 as a whole enables connectivity between the connected UEs 1012, 1014 and the host computer 1016. The connectivity may be described as an Over-the-Top (OTT) connection 1024. The host computer 1016 and the connected UEs 1012, 1014 are configured to communicate data and/or signaling via the OTT connection 1024, using the access network 1002, the core network 1004, any intermediate network 1022, and possible further infrastructure (not shown) as intermediaries. The OTT connection 1024 may be transparent in the sense that the participating communication devices through which the OTT connection 1024 passes are unaware of routing of uplink and downlink communications. For example, the base station 1006 may not or need not be informed about the past routing of an incoming downlink communication with data originating from the host computer 1016 to be forwarded (e.g., handed over) to a connected UE 1012. Similarly, the base station 1006 need not be aware of the future routing of an outgoing uplink communication originating from the UE 1012 towards the host computer 1016.

Example implementations, in accordance with an embodiment, of the UE, base station, and host computer discussed in the preceding paragraphs will now be described with reference to FIG. 11. In a communication system 1100, a host computer 1102 comprises hardware 1104 including a communication interface 1106 configured to set up and maintain a wired or wireless connection with an interface of a different communication device of the communication system 1100. The host computer 1102 further comprises processing circuitry 1108, which may have storage and/or processing capabilities. In particular, the processing circuitry 1108 may comprise one or more programmable processors, ASICs, FPGAs, or combinations of these (not shown) adapted to execute instructions. The host computer 1102 further comprises software 1110, which is stored in or accessible by the host computer 1102 and executable by the processing circuitry 1108. The software 1110 includes a host application 1112. The host application 1112 may be operable to provide a service to a remote user, such as a UE 1114 connecting via an OTT connection 1116 terminating at the UE 1114 and the host computer 1102. In providing the service to the remote user, the host application 1112 may provide user data which is transmitted using the OTT connection 1116.

The communication system 1100 further includes a base station 1118 provided in a telecommunication system and comprising hardware 1120 enabling it to communicate with the host computer 1102 and with the UE 1114. The hardware 1120 may include a communication interface 1122 for setting up and maintaining a wired or wireless connection with an interface of a different communication device of the communication system 1100, as well as a radio interface 1124 for setting up and maintaining at least a wireless connection 1126 with the UE 1114 located in a coverage area (not shown in FIG. 11) served by the base station 1118. The communication interface 1122 may be configured to facilitate a connection 1128 to the host computer 1102. The connection 1128 may be direct or it may pass through a core network (not shown in FIG. 11) of the telecommunication system and/or through one or more intermediate networks outside the telecommunication system. In the embodiment shown, the hardware 1120 of the base station 1118 further includes processing circuitry 1130, which may comprise one or more programmable processors, ASICs, FPGAs, or combinations of these (not shown) adapted to execute instructions. The base station 1118 further has software 1132 stored internally or accessible via an external connection.

The communication system 1100 further includes the UE 1114 already referred to. The UE's 1114 hardware 1134 may include a radio interface 1136 configured to set up and maintain a wireless connection 1126 with a base station serving a coverage area in which the UE 1114 is currently located. The hardware 1134 of the UE 1114 further includes processing circuitry 1138, which may comprise one or more programmable processors, ASICs, FPGAs, or combinations of these (not shown) adapted to execute instructions. The UE 1114 further comprises software 1140, which is stored in or accessible by the UE 1114 and executable by the processing circuitry 1138. The software 1140 includes a client application 1142. The client application 1142 may be operable to provide a service to a human or non-human user via the UE 1114, with the support of the host computer 1102. In the host computer 1102, the executing host application 1112 may communicate with the executing client application 1142 via the OTT connection 1116 terminating at the UE 1114 and the host computer 1102. In providing the service to the user, the client application 1142 may receive request data from the host application 1112 and provide user data in response to the request data. The OTT connection 1116 may transfer both the request data and the user data. The client application 1142 may interact with the user to generate the user data that it provides.

Figure 11:
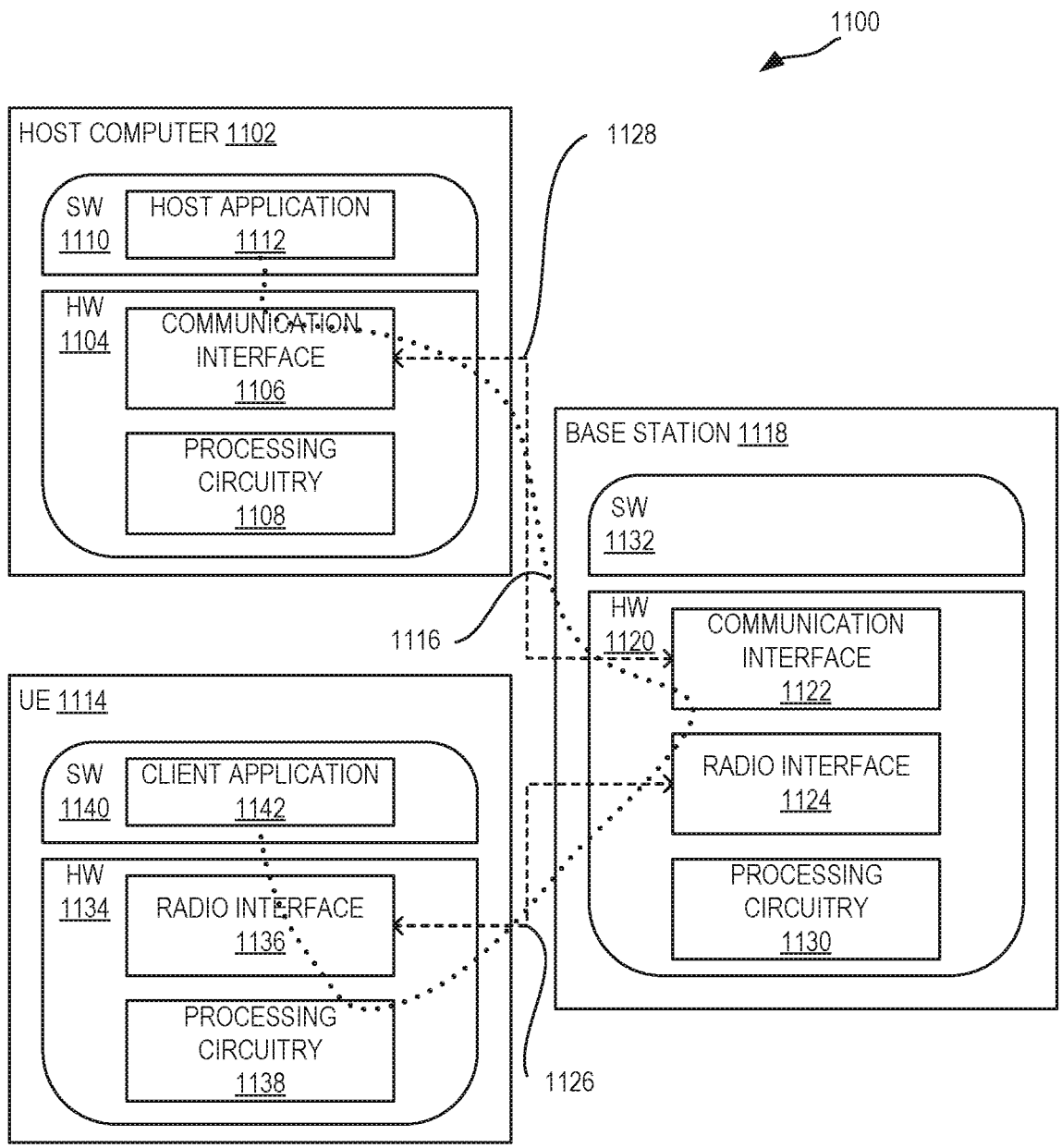
FIG. 11 illustrates an example implementation of the UE, base station, and host computer of FIG. 10.

It is noted that the host computer 1102, the base station 1118, and the UE 1114 illustrated in FIG. 11 may be similar or identical to the host computer 1016, one of the base stations 1006A, 1006B, 1006C, and one of the UEs 1012, 1014 of FIG. 10, respectively. This is to say, the inner workings of these entities may be as shown in FIG. 11 and independently, the surrounding network topology may be that of FIG. 10.

In FIG. 11, the OTT connection 1116 has been drawn abstractly to illustrate the communication between the host computer 1102 and the UE 1114 via the base station 1118 without explicit reference to any intermediary devices and the precise routing of messages via these devices. The network infrastructure may determine the routing, which may be configured to hide from the UE 1114 or from the service provider operating the host computer 1102, or both. While the OTT connection 1116 is active, the network infrastructure may further take decisions by which it dynamically changes the routing (e.g., on the basis of load balancing consideration or reconfiguration of the network).

The wireless connection 1126 between the UE 1114 and the base station 1118 is in accordance with the teachings of the embodiments described throughout this disclosure. One or more of the various embodiments improve the performance of OTT services provided to the UE 1114 using the OTT connection 1116, in which the wireless connection 1126 forms the last segment. More precisely, the teachings of these embodiments may provide flexibility to the base station 1118 for scheduling transmissions and retransmissions, which can improve the data rate and latency of the OTT connection 1116.

A measurement procedure may be provided for the purpose of monitoring data rate, latency, and other factors on which the one or more embodiments improve. There may further be an optional network functionality for reconfiguring the OTT connection 1116 between the host computer 1102 and the UE 1114, in response to variations in the measurement results. The measurement procedure and/or the network functionality for reconfiguring the OTT connection 1116 may be implemented in the software 1110 and the hardware 1104 of the host computer 1102 or in the software 1140 and the hardware 1134 of the UE 1114, or both. In some embodiments, sensors (not shown) may be deployed in or in association with communication devices through which the OTT connection 1116 passes; the sensors may participate in the measurement procedure by supplying values of the monitored quantities exemplified above, or supplying values of other physical quantities from which the software 1110, 1140 may compute or estimate the monitored quantities. The reconfiguring of the OTT connection 1116 may include message format, retransmission settings, preferred routing, etc.; the reconfiguring need not affect the base station 1118, and it may be unknown or imperceptible to the base station 1118. Such procedures and functionalities may be known and practiced in the art. In certain embodiments, measurements may involve proprietary UE signaling facilitating the host computer 1102's measurements of throughput, propagation times, latency, and the like. The measurements may be implemented in that the software 1110 and 1140 causes messages to be transmitted, in particular empty or 'dummy' messages, using the OTT connection 1116 while it monitors propagation times, errors, etc.

FIG. 12 is a flowchart illustrating a method implemented in a communication system, in accordance with one embodiment. The communication system includes a host computer, a base station, and a UE which may be those described with reference to FIGS. 10 and 11. For simplicity of the present disclosure, only drawing references to FIG. 12 will be included in this section. In step 1200, the host computer provides user data. In sub-step 1202 (which may be optional) of step 1200, the host computer provides the user data by executing a host application. In step 1204, the host computer initiates a transmission carrying the user data to the UE. In step 1206 (which may be optional), the base station transmits to the UE the user data which was carried in the transmission that the host computer initiated, in accordance with the teachings of the embodiments described throughout this disclosure. In step 1208 (which may also be optional), the UE executes a client application associated with the host application executed by the host computer.

FIG. 13 is a flowchart illustrating a method implemented in a communication system, in accordance with one embodiment. The communication system includes a host computer, a base station, and a UE which may be those described with reference to FIGS. 10 and 11. For simplicity of the present disclosure, only drawing references to FIG. 13 will be included in this section. In step 1300 of the method, the host computer provides user data. In an optional sub-step (not shown) the host computer provides the user data by executing a host application. In step 1302, the host computer initiates a transmission carrying the user data to the UE. The transmission may pass via the base station, in accordance with the teachings of the embodiments described throughout this disclosure. In step 1304 (which may be optional), the UE receives the user data carried in the transmission.

Figures 14, 15:
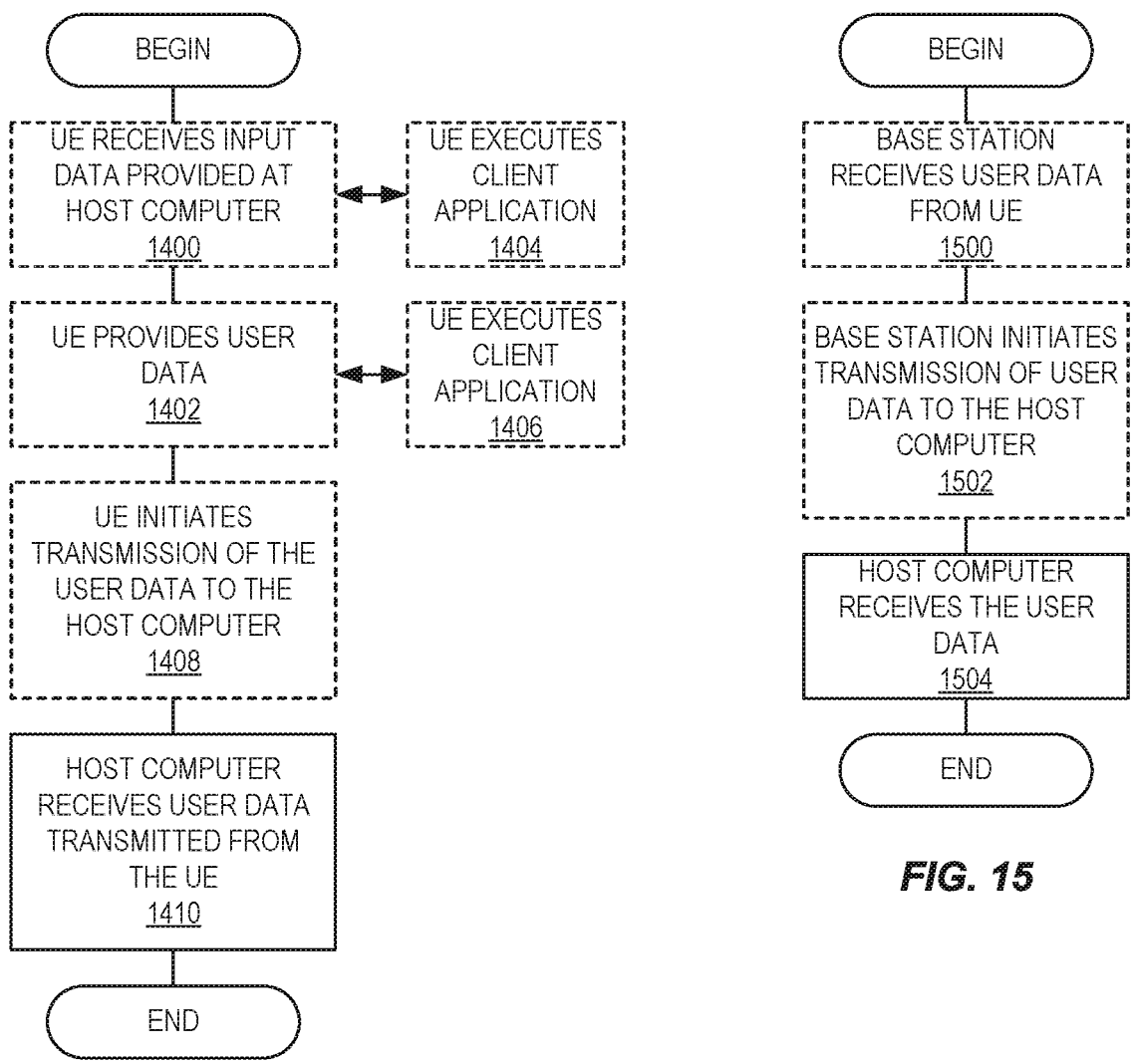
FIG. 14 is a flowchart illustrating a method implemented in a communication system, in accordance with one embodiment.
FIG. 15 is a flowchart illustrating a method implemented in a communication system, in accordance with one embodiment.

FIG. 14 is a flowchart illustrating a method implemented in a communication system, in accordance with one embodiment. The communication system includes a host computer, a base station, and a UE which may be those described with reference to FIGS. 10 and 11. For simplicity of the present disclosure, only drawing references to FIG. 14 will be included in this section. In step 1400 (which may be optional), the UE receives input data provided by the host computer. Additionally or alternatively, in step 1402, the UE provides user data. In sub-step 1404 (which may be optional) of step 1400, the UE provides the user data by executing a client application. In sub-step 1406 (which may be optional) of step 1402, the UE executes a client application which provides the user data in reaction to the received input data provided by the host computer. In providing the user data, the executed client application may further consider user input received from the user. Regardless of the specific manner in which the user data was provided, the UE initiates, in sub-step 1408 (which may be optional), transmission of the user data to the host computer. In step 1410 of the method, the host computer receives the user data transmitted from the UE, in accordance with the teachings of the embodiments described throughout this disclosure.

FIG. 15 is a flowchart illustrating a method implemented in a communication system, in accordance with one embodiment. The communication system includes a host computer, a base station, and a UE which may be those described with reference to FIGS. 10 and 11. For simplicity of the present disclosure, only drawing references to FIG. 15 will be included in this section. In step 1500 (which may be optional), in accordance with the teachings of the embodiments described throughout this disclosure, the base station receives user data from the UE. In step 1502 (which may be optional), the base station initiates transmission of the received user data to the host computer. In step 1504 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include Digital Signal Processor (DSPs), special-purpose digital logic, and the like. The processing circuitry may be configured to execute program code stored in memory, which may include one or several types of memory such as Read Only Memory (ROM), Random Access Memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

While processes in the figures may show a particular order of operations performed by certain embodiments of the present disclosure, it should be understood that such order is exemplary (e.g., alternative embodiments may perform the operations in a different order, combine certain operations, overlap certain operations, etc.).

Group A Embodiments

Embodiment 1: A method performed by a wireless device for transmitting uplink data over multiple configured grant configurations, the method comprising: receiving a first uplink grant associated with a first HARQ process ID; determining whether the first HARQ process ID belongs to a first grant configuration; and if the first HARQ process ID belongs to the first grant configuration, setting a first configured grant timer for the first grant configuration.

Embodiment 2: The method of embodiment 1, further comprising: if the first HARQ process ID does not belong to the first grant configuration, determining whether the first HARQ process ID belongs to a second grant configuration; and if the first HARQ process ID belongs to the second grant configuration, setting a second configured grant timer for the second grant configuration.

Embodiment 3: The method of any of embodiments 1 to 2, wherein the first HARQ process ID belongs to the first grant configuration if the HARQ process ID comprises an offset associated with the first grant configuration.

Embodiment 4: The method of any of embodiments 1 to 3, wherein the first uplink grant is received over an RRC message.

Embodiment 5: The method of any of embodiments 1 to 4, wherein the first uplink grant is received over a DCI message.

Embodiment 6: A method performed by a wireless device for transmitting uplink data over multiple configured grant configurations, the method comprising: receiving a first uplink grant associated with a first HARQ process ID; determining whether the first HARQ process ID is less than or equal to a threshold HARQ process offset; and if the first HARQ process ID is less than or equal to a threshold HARQ process offset, setting a first configured grant timer for the first uplink grant.

Embodiment 7: The method of embodiment 6, wherein the threshold HARQ process offset comprises a largest HARQ process offset for a group of HARQ processes.

Embodiment 8: The method of any of embodiments 6 to 7, wherein the first uplink grant is received over an RRC message.

Embodiment 9: The method of any of embodiments 6 to 8, wherein the first uplink grant is received over a DCI message.

Embodiment 10: The method of any of the previous embodiments, further comprising: providing user data; and forwarding the user data to a host computer via the transmission to the base station.

Group B Embodiments

Embodiment 11: A method performed by a base station for allocating uplink grants for multiple grant configurations, the method comprising: allocating a first uplink grant for a first HARQ process associated with a first HARQ process ID; allocating a second uplink grant for a second HARQ process associated with a second HARQ process ID; setting a first HARQ process ID offset for the first HARQ process; setting a second HARQ process ID offset for the second HARQ process distinct from the first HARQ process ID offset; setting a first configured grant timer for the first grant configuration; and setting a second configured grant timer for the second grant configuration.

Embodiment 12: The method of embodiment 11, further comprising:

deactivating a third uplink grant; and in response to deactivating the third uplink grant, resetting the first HARQ process ID offset.

Embodiment 13: The method of any of embodiments 11 to 12, wherein allocating the first uplink grant comprises sending an RRC message.

Embodiment 14: The method of any of embodiments 11 to 13, wherein allocating the first uplink grant comprises sending a DCI message.

Embodiment 15: The method of any of the previous embodiments, further comprising: obtaining user data; and forwarding the user data to a host computer or a wireless device.

Group C Embodiments

Embodiment 16: A wireless device for transmitting uplink data over multiple configured grant configurations, the wireless device comprising: processing circuitry configured to perform any of the steps of any of the Group A embodiments; and power supply circuitry configured to supply power to the wireless device.

Embodiment 17: A base station for allocating uplink grants for multiple grant configurations, the base station comprising: processing circuitry configured to perform any of the steps of any of the Group B embodiments; and power supply circuitry configured to supply power to the base station.

Embodiment 18: A User Equipment, UE, for transmitting uplink data over multiple configured grant configurations, the UE comprising: an antenna configured to send and receive wireless signals; radio front-end circuitry connected to the antenna and to processing circuitry, and configured to condition signals communicated between the antenna and the processing circuitry; the processing circuitry being configured to perform any of the steps of any of the Group A embodiments; an input interface connected to the processing circuitry and configured to allow input of information into the UE to be processed by the processing circuitry; an output interface connected to the processing circuitry and configured to output information from the UE that has been processed by the processing circuitry; and a battery connected to the processing circuitry and configured to supply power to the UE.

Embodiment 19: A communication system including a host computer comprising: processing circuitry configured to provide user data; and a communication interface configured to forward the user data to a cellular network for transmission to a User Equipment, UE; wherein the cellular network comprises a base station having a radio interface and processing circuitry, the base station's processing circuitry configured to perform any of the steps of any of the Group B embodiments.

Embodiment 20: The communication system of the previous embodiment further including the base station.

Embodiment 21: The communication system of the previous 2 embodiments, further including the UE, wherein the UE is configured to communicate with the base station.

Embodiment 22: The communication system of the previous 3 embodiments, wherein: the processing circuitry of the host computer is configured to execute a host application, thereby providing the user data; and the UE comprises processing circuitry configured to execute a client application associated with the host application.

Embodiment 23: A method implemented in a communication system including a host computer, a base station, and a User Equipment, UE, the method comprising: at the host computer, providing user data; and at the host computer, initiating a transmission carrying the user data to the UE via a cellular network comprising the base station, wherein the base station performs any of the steps of any of the Group B embodiments.

Embodiment 24: The method of the previous embodiment, further comprising, at the base station, transmitting the user data.

Embodiment 25: The method of the previous 2 embodiments, wherein the user data is provided at the host computer by executing a host application, the method further comprising, at the UE, executing a client application associated with the host application.

Embodiment 26: A User Equipment, UE, configured to communicate with a base station, the UE comprising a radio interface and processing circuitry configured to perform the method of the previous 3 embodiments.

Embodiment 27: A communication system including a host computer comprising: processing circuitry configured to provide user data; and a communication interface configured to forward user data to a cellular network for transmission to a User Equipment, UE; wherein the UE comprises a radio interface and processing circuitry, the UE's components configured to perform any of the steps of any of the Group A embodiments.

Embodiment 28: The communication system of the previous embodiment, wherein the cellular network further includes a base station configured to communicate with the UE.

Embodiment 29: The communication system of the previous 2 embodiments, wherein: the processing circuitry of the host computer is configured to execute a host application, thereby providing the user data; and the UE's processing circuitry is configured to execute a client application associated with the host application.

Embodiment 30: A method implemented in a communication system including a host computer, a base station, and a User Equipment, UE, the method comprising: at the host computer, providing user data; and at the host computer, initiating a transmission carrying the user data to the UE via a cellular network comprising the base station, wherein the UE performs any of the steps of any of the Group A embodiments.

Embodiment 31: The method of the previous embodiment, further comprising at the UE, receiving the user data from the base station.

Embodiment 32: A communication system including a host computer comprising: communication interface configured to receive user data originating from a transmission from a User Equipment, UE, to a base station; wherein the UE comprises a radio interface and processing circuitry, the UE's processing circuitry configured to perform any of the steps of any of the Group A embodiments.

Embodiment 33: The communication system of the previous embodiment, further including the UE.

Embodiment 34: The communication system of the previous 2 embodiments, further including the base station, wherein the base station comprises a radio interface configured to communicate with the UE and a communication interface configured to forward to the host computer the user data carried by a transmission from the UE to the base station.

Embodiment 35: The communication system of the previous 3 embodiments, wherein: the processing circuitry of the host computer is configured to execute a host application; and the UE's processing circuitry is configured to execute a client application associated with the host application, thereby providing the user data.

Embodiment 36: The communication system of the previous 4 embodiments, wherein: the processing circuitry of the host computer is configured to execute a host application, thereby providing request data; and the UE's processing circuitry is configured to execute a client application associated with the host application, thereby providing the user data in response to the request data.

Embodiment 37: A method implemented in a communication system including a host computer, a base station, and a User Equipment, UE, the method comprising: at the host computer, receiving user data transmitted to the base station from the UE, wherein the UE performs any of the steps of any of the Group A embodiments.

Embodiment 38: The method of the previous embodiment, further comprising, at the UE, providing the user data to the base station.

Embodiment 39: The method of the previous 2 embodiments, further comprising: at the UE, executing a client application, thereby providing the user data to be transmitted; and at the host computer, executing a host application associated with the client application.

Embodiment 40: The method of the previous 3 embodiments, further comprising: at the UE, executing a client application; and at the UE, receiving input data to the client application, the input data being provided at the host computer by executing a host application associated with the client application; wherein the user data to be transmitted is provided by the client application in response to the input data.

Embodiment 41: A communication system including a host computer comprising a communication interface configured to receive user data originating from a transmission from a User Equipment, UE, to a base station, wherein the base station comprises a radio interface and processing circuitry, the base station's processing circuitry configured to perform any of the steps of any of the Group B embodiments.

Embodiment 42: The communication system of the previous embodiment further including the base station.

Embodiment 43: The communication system of the previous 2 embodiments, further including the UE, wherein the UE is configured to communicate with the base station.

Embodiment 44: The communication system of the previous 3 embodiments, wherein: the processing circuitry of the host computer is configured to execute a host application; and the UE is configured to execute a client application associated with the host application, thereby providing the user data to be received by the host computer.

Embodiment 45: A method implemented in a communication system including a host computer, a base station, and a User Equipment, UE, the method comprising: at the host computer, receiving, from the base station, user data originating from a transmission which the base station has received from the UE, wherein the UE performs any of the steps of any of the Group A embodiments.

Embodiment 46: The method of the previous embodiment, further comprising at the base station, receiving the user data from the UE.

Embodiment 47: The method of the previous 2 embodiments, further comprising at the base station, initiating a transmission of the received user data to the host computer.

At least some of the following abbreviations may be used in this disclosure. If there is an inconsistency between abbreviations, preference should be given to how it is used above. If listed multiple times below, the first listing should be preferred over any subsequent listing(s).

3GPP Third Generation Partnership Project
5G Fifth Generation
AP Access Point
ASIC Application Specific Integrated Circuit
BSC Base Station Controller
BTS Base Transceiver Station
CD Compact Disk
COTS Commercial Off-the-Shelf
CPE Customer Premise Equipment
CPU Central Processing Unit
D2D Device-to-Device
DAS Distributed Antenna System
DSP Digital Signal Processor
DVD Digital Video Disk
eNB Enhanced or Evolved Node B
E-SMLC Evolved Serving Mobile Location Center
FPGA Field Programmable Gate Array
GHz Gigahertz
gNB New Radio Base Station
gNB-CU New Radio Base Station Central Unit
gNB-DU New Radio Base Station Distributed Unit
GSM Global System for Mobile Communications
IoT Internet of Things
IP Internet Protocol
LEE Laptop Embedded Equipment
LME Laptop Mounted Equipment
LTE Long Term Evolution
M2M Machine-to-Machine
MANO Management and Orchestration
MCE Multi-Cell/Multicast Coordination Entity
MDT Minimization of Drive Tests
MIMO Multiple Input Multiple Output
MME Mobility Management Entity
MSC Mobile Switching Center
MSR Multi-Standard Radio
MTC Machine Type Communication
NB-IoT Narrowband Internet of Things
NFV Network Function Virtualization
NIC Network Interface Controller
NR New Radio
NRF Network Function Repository Function
O&M Operation and Maintenance
OSS Operations Support System
OTT Over-the-Top
PC Personal Computer
PDA Personal Digital Assistant
P-GW Packet Data Network Gateway
RAM Random Access Memory
RAN Radio Access Network
RAT Radio Access Technology
RF Radio Frequency
RNC Radio Network Controller
ROM Read Only Memory
RRH Remote Radio Head
RRU Remote Radio Unit
SCEF Service Capability Exposure Function
SOC System on a Chip
SON Self-Organizing Network
UE User Equipment USB Universal Serial Bus
V2I Vehicle-to-Infrastructure
V2V Vehicle-to-Vehicle
V2X Vehicle-to-Everything
VMM Virtual Machine Monitor
VNE Virtual Network Element
VNF Virtual Network Function
VoIP Voice over Internet Protocol
WCDMA Wideband Code Division Multiple Access
WiMax Worldwide Interoperability for Microwave Access Those skilled in the art will recognize improvements and modifications to the embodiments of the present disclosure. All such improvements and modifications are considered within the scope of the concepts disclosed herein.

What is claimed is:

1. A method performed by a wireless device for a Hybrid Automatic Repeat Request, HARQ, process in a cell configurable for multiple configured uplink grants, the method comprising:
receiving an uplink grant comprising a HARQ process Identifier, ID;
determining that a HARQ process associated with the HARQ process ID is configured for a configured uplink grant based on the HARQ process ID, a HARQ process ID offset, and a number of HARQ processes for a configured grant configuration, wherein the HARQ process ID is greater than or equal to the HARQ process ID offset and less than a sum of the HARQ process ID offset and the number of HARQ processes for the configured grant configuration; and
starting or restarting a configured grant timer for the HARQ process.

2. The method of claim 1, wherein the HARQ process ID is associated with a grant configuration of the configured uplink grant.

3. The method of claim 1, wherein the HARQ process ID for the configured uplink grant is determined according to:

HARQ Process ID=[floor(CURRENT_symbol/periodicity)]modulo nrofHARQ-Processes+harq-procID-offset, where CURRENT_symbol is a symbol index of a data transmission for the uplink grant, periodicity is a periodicity of the uplink grant, nrofHARQ-Processes is a number of HARQ processes for configured grants, and harq-procID-offset is the HARQ process ID offset.

4. The method of claim 3, wherein the harq-procID-offset and the nrofHARQ-Processes for the uplink grant is received by one or more Radio Resource Control, RRC, messages, one or more Downlink Control Information, DCI, messages, or a combination of one or more RRC messages and one or more DCI messages.

5. The method of claim 1, further comprising transmitting uplink data in accordance with the uplink grant.

6. The method of claim 5, wherein the uplink data comprises the HARQ process ID offset.

7. A method performed by a wireless device for transmitting uplink data using a Hybrid Automatic Repeat Request, HARQ, process, the method comprising:
receiving a first uplink grant associated with a first HARQ process Identifier, ID;
determining that a first HARQ process is configured for a first configured uplink grant based on the HARQ process ID, a HARQ process ID offset, and a number of HARQ processes for a configured grant configuration, wherein the HARQ process ID is greater than or equal to the HARQ process ID offset and less than a sum of the HARQ process ID offset and the number of HARQ processes for configured grant configuration; and
setting a first configured grant timer for the first uplink grant in accordance with the first HARQ process.

8. The method of claim 7, wherein:
the first HARQ process is identified by the first HARQ process ID; and
the first HARQ process ID is determined according to:

HARQ Process ID=[floor(CURRENT_symbol/periodicity)]modulo nrofHARQ-Processes+harq-procID-offset, where CURRENT_symbol is a symbol index of a data transmission for the uplink grant, periodicity is a periodicity of the uplink grant, nrofHARQ-Processes is a number of HARQ processes for configured grants, and harq-procID-offset is the first HARQ process ID offset.

9. The method of claim 7, further comprising:
receiving a second uplink grant associated with a second HARQ process ID;
determining that a second HARQ process associated with the second HARQ process ID is configured for a second configured uplink grant based on a second HARQ process ID offset; and
setting a second configured grant timer for the second uplink grant in accordance with the second HARQ process.

10. A method performed by a base station for allocating uplink grants for multiple grant configurations, the method comprising:
configuring a first uplink grant for a first traffic flow;
configuring a second uplink grant for a second traffic flow;
setting a first Hybrid Automatic Repeat Request, HARQ, process Identifier, ID, offset for the first uplink grant, the first HARQ process ID offset corresponding to a first HARQ process ID;
setting a second HARQ process ID offset for the second uplink grant; and
providing the first HARQ process ID offset to a first User Equipment, UE, associated with the first traffic flow.

11. The method of claim 10, further comprising providing the second HARQ process ID offset to the first UE.

12. The method of claim 10, further comprising providing the second HARQ process ID offset to a second UE associated with the second traffic flow.

13. The method of claim 10, further comprising:
deactivating the second uplink grant;
resetting the first HARQ process ID offset in response to deactivating the second uplink grant.

14. The method of claim 13, further comprising updating the number of HARQ processes configured for configured grant in response to deactivating the second uplink grant.

15. The method of claim 10, wherein the first HARQ process ID offset is provided through a Radio Resource Control, RRC, message.

16. The method of claim 10, wherein the first HARQ process ID offset is provided through a Downlink Control Information, DCI, message.

17. A wireless device for configuring a Hybrid Automatic Repeat Request, HARQ, process in a cell configurable for multiple uplink grants, the wireless device adapted to:
receive an uplink grant comprising a HARQ process Identifier, ID;
determine that a HARQ process associated with the HARQ process ID is configured for a configured uplink grant based on the HARQ process ID, a HARQ process ID offset, and a number of HARQ processes for a configured grant configuration, wherein the HARQ process ID is greater than or equal to the HARQ process ID offset and less than a sum of the HARQ process ID offset and the number of HARQ processes for the configured grant configuration; and start or restart a configured grant timer for the HARQ process.

18. The wireless device of claim 17 comprising processing circuitry configured to cause the wireless device to:

receive the uplink grant comprising the HARQ process ID; and start or restart the configured grant timer for the HARQ process.

19. A base station for allocating uplink grants for multiple grant configurations, the base station adapted:

configure a first uplink grant for a first traffic flow;

configure a second uplink grant for a second traffic flow;

set a first Hybrid Automatic Repeat Request, HARQ, process Identifier, ID, offset for the first uplink grant, the first HARQ process ID offset corresponding to a first HARQ process ID;

set a second HARQ process ID offset for the second uplink grant; and provide the first HARQ process ID offset to a first User Equipment, UE, associated with the first traffic flow;

determining a number of HARQ processes configured for configured grant; and providing the number of HARQ processes configured for configured grant to the first UE.

* * * * *